(12) United States Patent
Chiang et al.

(10) Patent No.: US 11,442,511 B2
(45) Date of Patent: Sep. 13, 2022

(54) PRESSING MODULE

(71) Applicant: PEGATRON CORPORATION, Taipei (TW)

(72) Inventors: Tsung-Han Chiang, Taipei (TW); Chun-Sheng Li, Taipei (TW)

(73) Assignee: PEGATRON CORPORATION, Taipei (TW)

(*) Notice: Subject to any disclaimer, the term of this patent is extended or adjusted under 35 U.S.C. 154(b) by 13 days.

(21) Appl. No.: 17/302,322

(22) Filed: Apr. 30, 2021

(65) Prior Publication Data
US 2022/0035465 A1 Feb. 3, 2022

(30) Foreign Application Priority Data

Jul. 29, 2020 (TW) .................................. 109125679

(51) Int. Cl.
*G06F 1/16* (2006.01)
*G06F 1/18* (2006.01)
*G06F 3/0354* (2013.01)

(52) U.S. Cl.
CPC ............ *G06F 1/169* (2013.01); *G06F 1/1656* (2013.01); *G06F 1/182* (2013.01); *G06F 1/1616* (2013.01); *G06F 3/03547* (2013.01)

(58) Field of Classification Search
CPC ...... G06F 1/169; G06F 1/182; G06F 3/03547; G06F 1/1656
See application file for complete search history.

(56) References Cited

U.S. PATENT DOCUMENTS

| 8,803,852 | B2* | 8/2014 | Tsai | G06F 1/169 |
| | | | | 345/184 |
| 9,000,312 | B2 | 4/2015 | Shen et al. | |
| 2006/0256079 | A1* | 11/2006 | Wu | G06F 1/169 |
| | | | | 345/156 |
| 2007/0046644 | A1* | 3/2007 | Lin | G06F 1/169 |
| | | | | 345/173 |
| 2011/0249383 | A1* | 10/2011 | Horii | G06F 1/169 |
| | | | | 361/679.01 |
| 2013/0234938 | A1* | 9/2013 | Xue | G06F 3/03547 |
| | | | | 345/158 |

(Continued)

FOREIGN PATENT DOCUMENTS

| CN | 103426675 B | 12/2013 | |
| WO | WO-2014065010 A1 * | 5/2014 | ............ G06F 1/169 |

*Primary Examiner* — Nidhi Thaker
(74) *Attorney, Agent, or Firm* — McClure, Qualey & Rodack, LLP (57) ABSTRACT

A pressing module includes a housing, an operation panel, a waterproof fixing frame, and an elastic member. The housing includes a first surface, a second surface opposite to the first surface and a slot. The slot passes through the first surface and the second surface. The operation panel is pressibly accommodated in the slot. The waterproof fixing frame is disposed on the second surface of the housing and the operation panel and covers a junction between the second surface and the operation panel. The elastic member is disposed on the waterproof fixing frame. The elastic member includes a fixed side and a movable side that are disposed on two opposite sides. The fixed side is fixed to the second surface, and the movable side is fixed to the operation panel, so that the elastic member can provide an elastic restoring force for the operation panel.

10 Claims, 8 Drawing Sheets

(56) References Cited

U.S. PATENT DOCUMENTS

2014/0139442 A1* 5/2014 Clayton .................. G06F 3/041
  345/173
2017/0038801 A1* 2/2017 Lee ......................... G06F 3/041
2019/0371543 A1* 12/2019 Chiang ............... G06F 3/03547

* cited by examiner

PRESSING MODULE

CROSS-REFERENCE TO RELATED APPLICATION

This application claims the priority benefit of Taiwan application serial no. 109125679, filed on Jul. 29, 2020. The entirety of the above-mentioned patent application is hereby incorporated by reference herein and made a part of this specification.

BACKGROUND

Technical Field

The present disclosure relates to a pressing module, and in particular, to a pressing module with a waterproof function.

Related Art

In traditional pressing waterproof products, pressing and waterproofing needs to be achieved through co-injection molding of plastic and rubber. Molds have higher costs and have lower yield rates than that obtained through ordinary single-material injection. In terms of a pressing tactility feedback, since an elastic arm is implemented by body elasticity of plastic and rubber, a good pressing tactility feedback is limited, so that a pressing area cannot be large, which may cause no tactility. Therefore, it is difficult for the traditional pressing waterproof product to be directly applied to waterproofing of pressing elements with larger areas (such as touch panels).

SUMMARY

In view of the above problems, an embodiment of the present disclosure provides a pressing module, including a housing, an operation panel, a waterproof fixing frame, and an elastic member. The housing includes a first surface, a second surface opposite to the first surface and a slot. The slot passes through the first surface and the second surface. The operation panel is pressibly accommodated in the slot. The waterproof fixing frame is disposed on the second surface of the housing and the operation panel and covers a junction between the second surface and the operation panel. The elastic member is disposed on the waterproof fixing frame. The elastic member includes a fixed side and a movable side opposite to the first side. The fixed side is fixed to the second surface, and the movable side is fixed to the operation panel, so that the elastic member can provide an elastic restoring force for the operation panel.

In some embodiments, a plurality of first protruding posts protrude from the second surface of the housing, a plurality of second protruding posts protrude from the operation panel, and the waterproof fixing frame is sleeved on the first protruding posts and the second protruding posts.

In some embodiments, the fixed side is sleeved on the first protruding posts and the second protruding posts, and the movable side is sleeved on the second protruding posts.

In some embodiments, the pressing module further includes a fixing member, and the fixing member is sleeved on the first protruding posts and is disposed between the waterproof fixing frame and the elastic member.

In some embodiments, a plurality of third protruding posts protrude from the fixing member, the fixed side of the elastic member is sleeved on the first protruding posts, the second protruding posts, and the third protruding posts, and the movable side of the elastic member is sleeved on the second protruding posts.

In some embodiments, the first protruding posts, the second protruding posts, and the third protruding posts are made of a hot-melt material.

In some embodiments, the elastic member further includes an elastic arm and a connecting portion. The connecting portion is connected between the movable side and the fixed side, one end of the elastic arm is connected to the connecting portion and another end of the elastic arm is extended toward the fixed side.

In some embodiments, the elastic member further includes an elastic arm and a connecting portion. The connecting portion is connected between the movable side and the fixed side, and one end of the elastic arm is connected to the connecting portion and, another end of the elastic arm is extended toward the fixed side. The elastic arm is sleeved on the first protruding posts to be assembled to the second surface, and the connecting portion is sleeved on the second protruding posts to be assembled to the operation panel.

In some embodiments, the fixed side, the movable side, and the connecting portion form a hollow frame.

In some embodiments, the waterproof fixing frame is a hollow frame.

In some embodiments, the fixing member is a hollow frame.

In some embodiments, the pressing module further includes a pressing feedback assembly disposed on the movable side of the elastic member and fixed to the second surface. The pressing feedback assembly includes an assembling plate and a resilient structure. The assembling plate is spaced apart from the operation panel by a gap. The resilient structure is disposed between the assembling plate and the operation panel and is located in the gap, one end of the resilient structure is connected to the assembling plate, and the other end abuts against the operation panel.

Based on the above, through the pressing module of the above embodiments of the present disclosure, the waterproof fixing frame covering the junction between the housing and the operation panel in the slot can prevent fluid or water vapor from flowing to a side of the second surface of the housing through the slot and via the gap between the housing and the operation panel. In addition, the elastic member can provide the elastic restoring force for the operation panel to rebound, so as to retain the pressing tactility feedback.

Detailed features and advantages of the present disclosure are described in detail in the following implementations, which are sufficient for any person skilled in the art to understand the technical content of the present disclosure and implement the operation accordingly. According to the content, the scope of patent application, and the drawings disclosed in this specification, any person skilled in the art can easily understand the related objective and advantage of the present disclosure.

DETAILED DESCRIPTION

Figure 1:
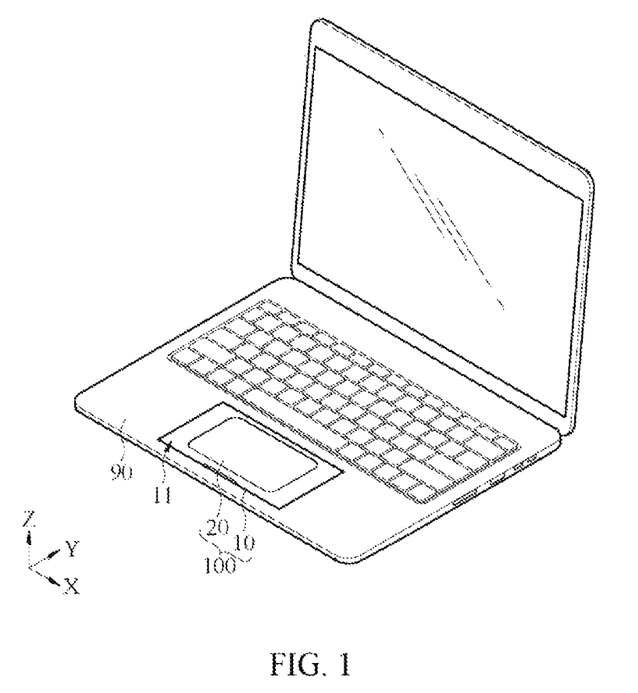
FIG. 1 is a schematic diagram of a pressing module disposed in an electronic device according to an embodiment of the present disclosure.
Figure 2:
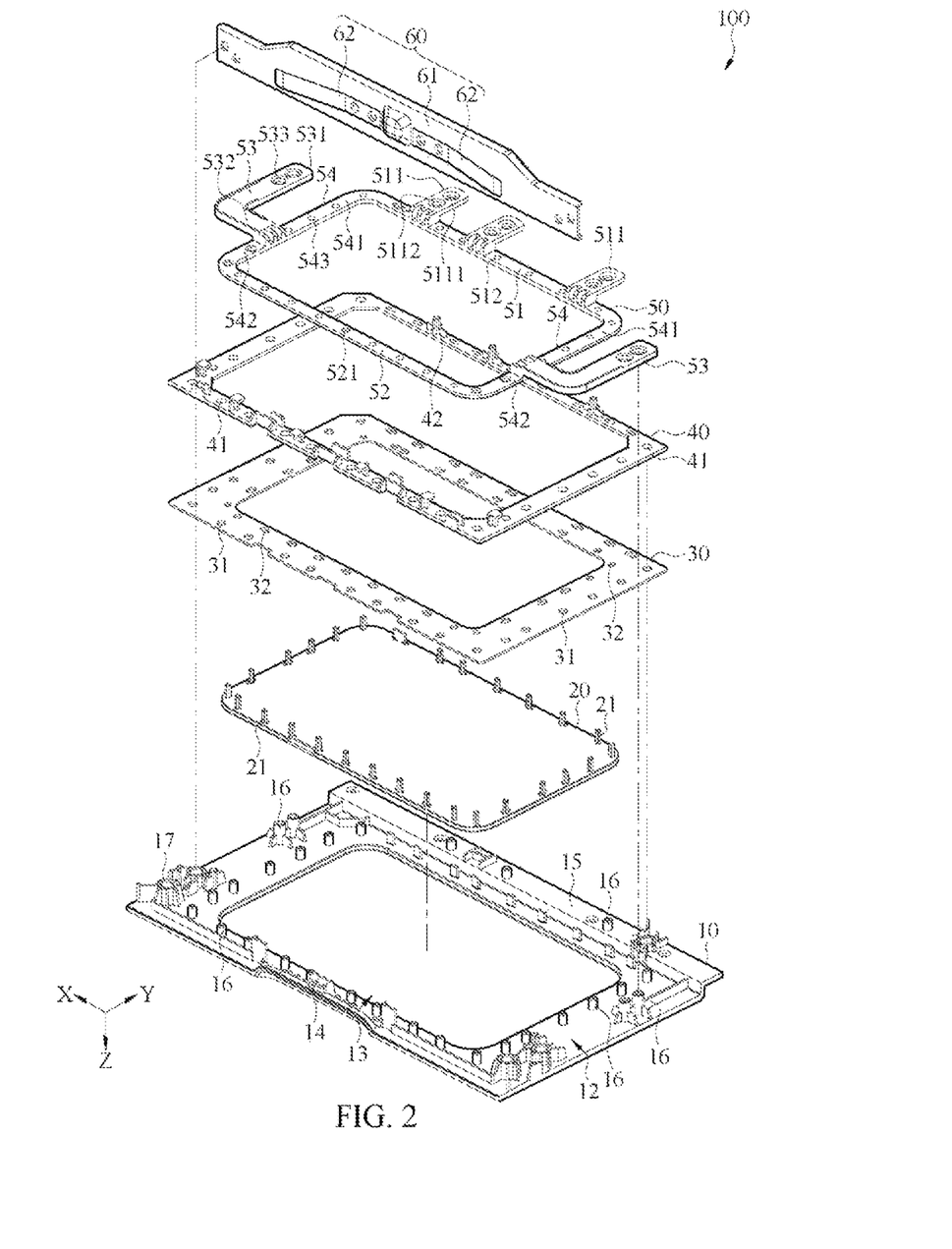
FIG. 2 is an exploded view of a pressing module according to an embodiment of the present disclosure.
Figure 3:
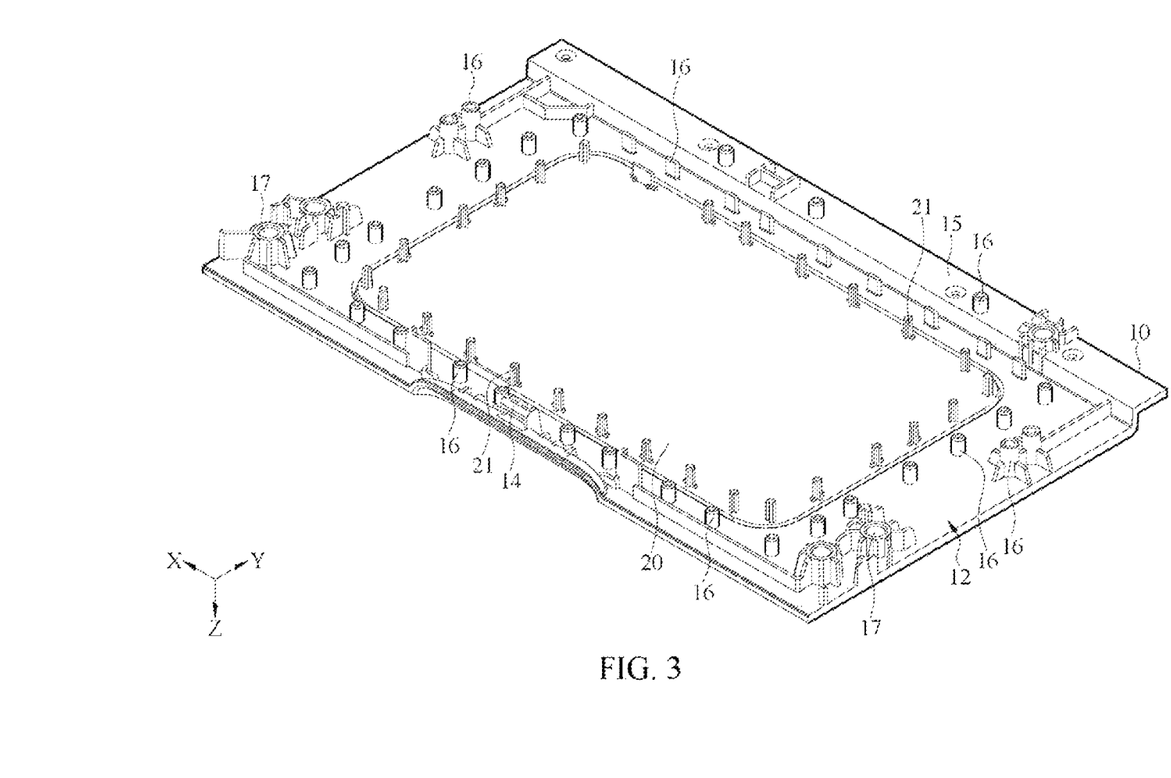
FIG. 3 is a schematic diagram of assembling of a housing and an operation panel according to an embodiment of the present disclosure.
Figure 4:
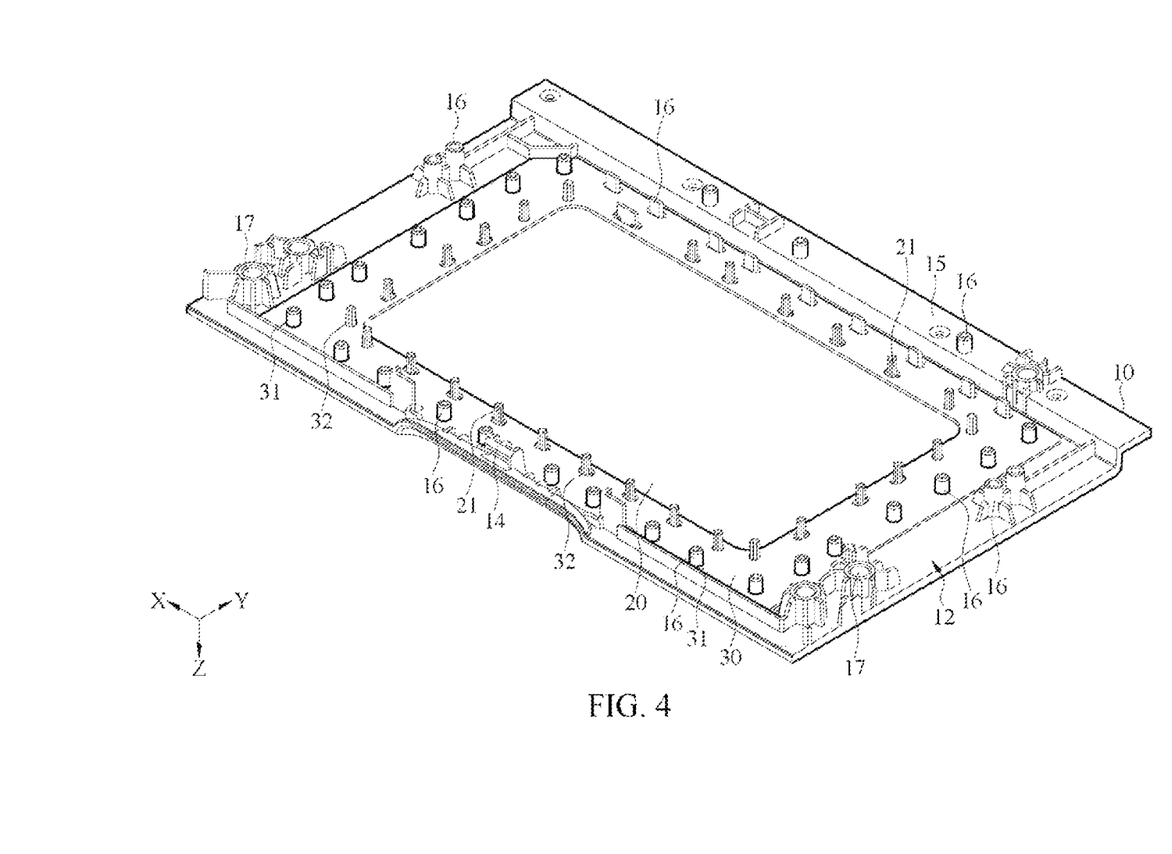
FIG. 4 is a schematic diagram of assembling of a waterproof fixing frame according to an embodiment of the present disclosure.
Figure 5:
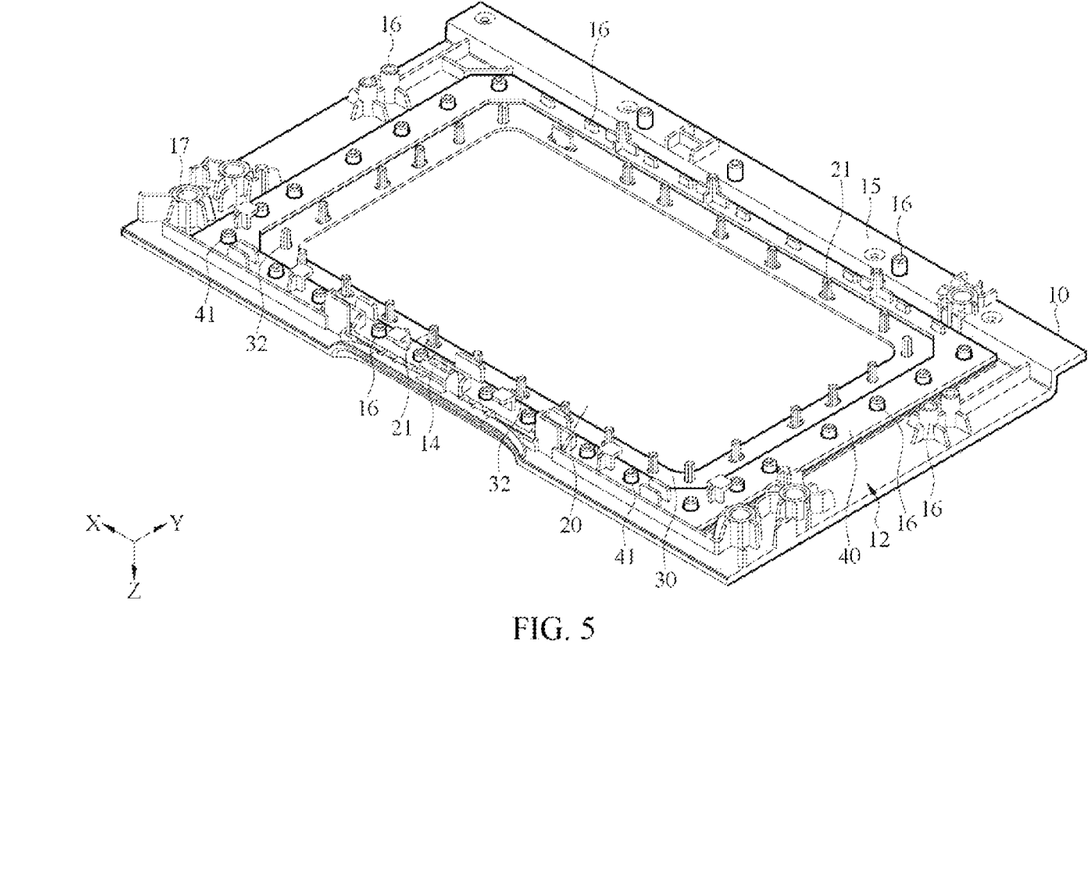
FIG. 5 is a schematic diagram of assembling of a fixing member according to an embodiment of the present disclosure.
Figure 6:
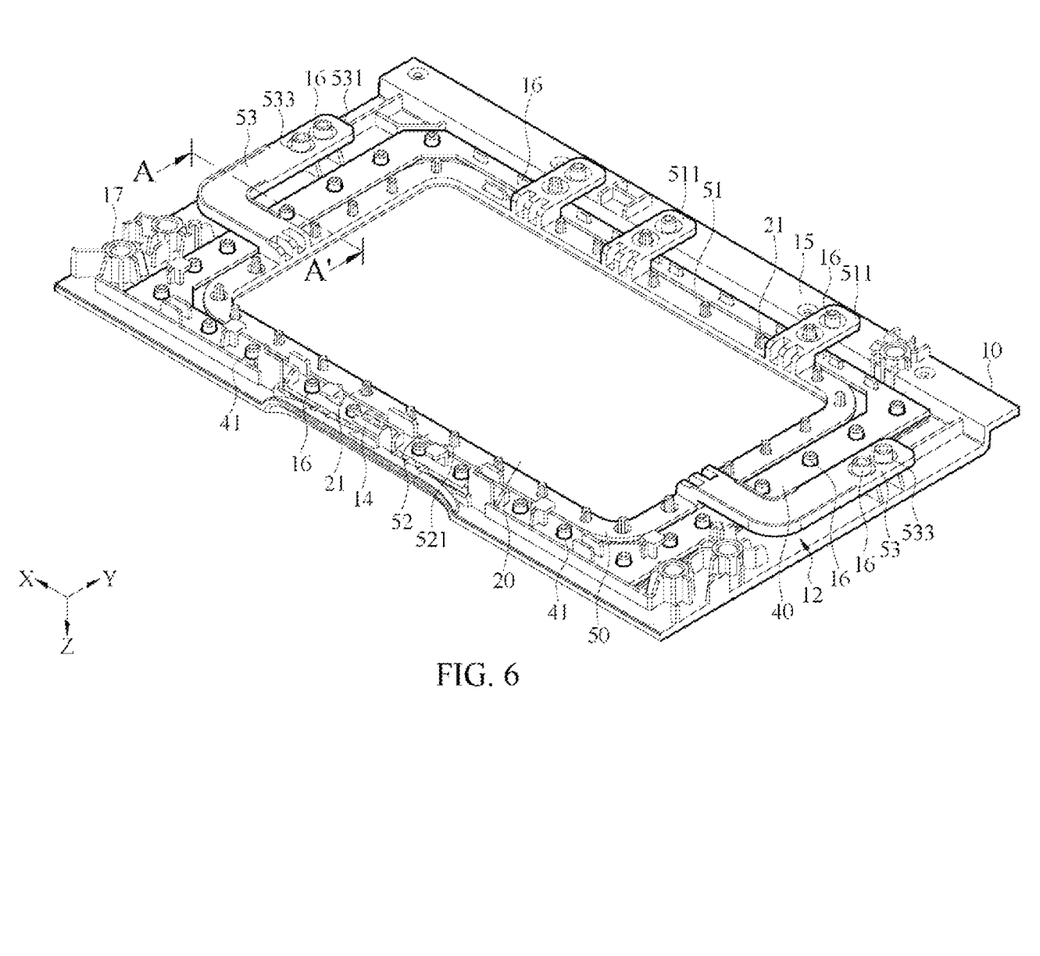
FIG. 6 is a schematic diagram of assembling of an elastic member according to an embodiment of the present disclosure.
Figure 7:
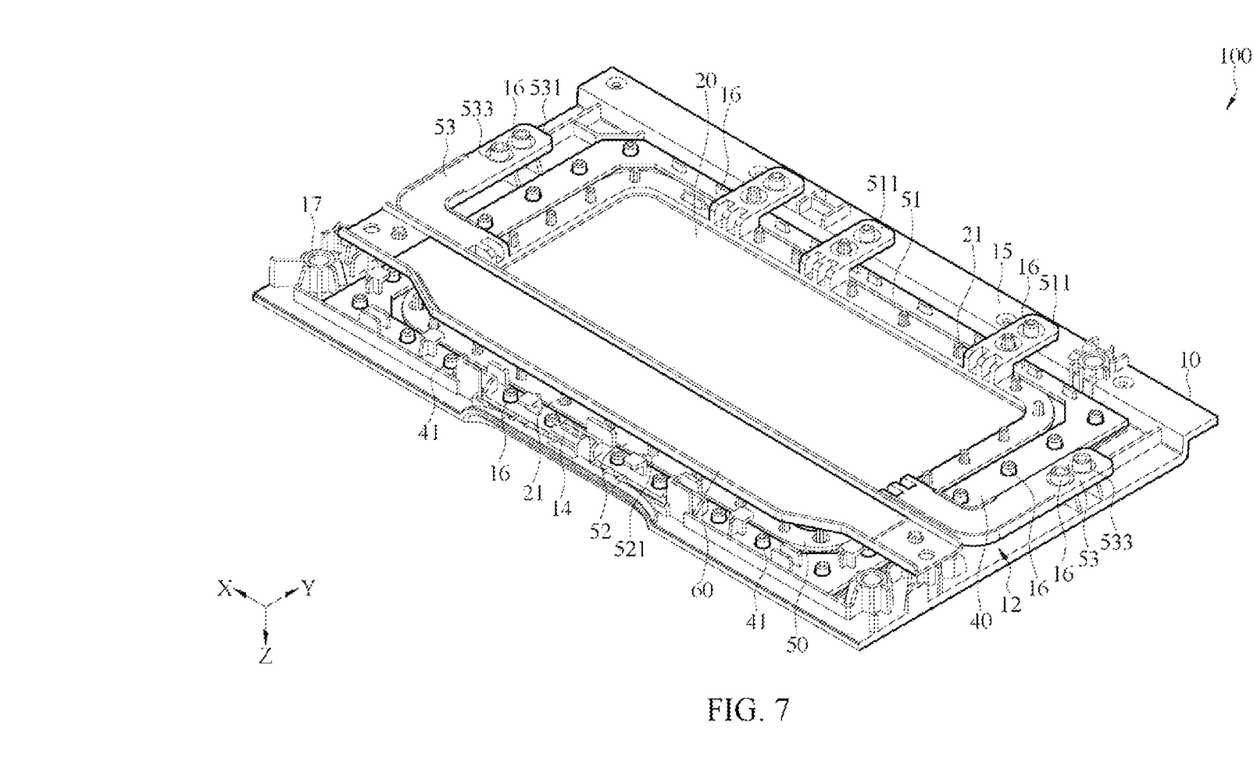
FIG. 7 is a schematic diagram of assembling of a reinforcing member according to an embodiment of the present disclosure.
Figure 8:
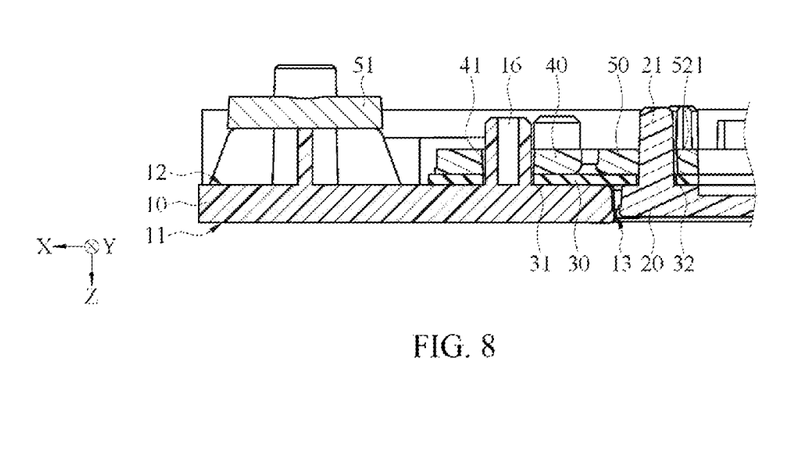
FIG. 8 is a schematic cross-sectional view taken along line AA' in FIG. 6 according to an embodiment of the present disclosure.

Referring to FIG. 1 to FIG. 8, FIG. 1 is a schematic diagram of a pressing module disposed in an electronic device according to an embodiment of the present disclosure. FIG. 2 is an exploded view of a pressing module according to an embodiment of the present disclosure. FIG. 3 is a schematic diagram of assembling of a housing and an operation panel according to an embodiment of the present disclosure. FIG. 4 is a schematic diagram of assembling of a waterproof fixing frame according to an embodiment of the present disclosure. FIG. 5 is a schematic diagram of assembling of a fixing member according to an embodiment of the present disclosure. FIG. 6 is a schematic diagram of assembling of an elastic member according to an embodiment of the present disclosure. FIG. 7 is a schematic diagram of assembling of a reinforcing member according to an embodiment of the present disclosure. FIG. 8 is a schematic cross-sectional view taken along line AA' in FIG. 6 according to an embodiment of the present disclosure.

As can be seen from FIG. 1, a pressing module 100 of the present embodiment may be a pressing module with a touch panel and is configured to be assembled to an electronic device 90 to perform a touch operation and provide pressing resilience tactility. The electronic device 90 is a notebook computer, for example, but the present disclosure is not limited thereto. The pressing module 100 may also be various pressing function elements that can provide pressing operations, for example, keyboard keys, a pressing operation panel of a mobile device, elevator keys, keys of a washing machine, or the like.

As can be seen from FIG. 1 and FIG. 2, the pressing module 100 includes a housing 10, an operation panel 20, a waterproof fixing frame 30, and an elastic member 50. The housing 10 includes a first surface 11, a second surface 12 and a slot 13. The second surface 12 is opposite to the first surface 11. The slot 13 passes through the first surface 11 and the second surface 12. For the convenience of description, a direction in which a long side of the housing 10 in FIG. 1 extends is defined as an axis X. A direction in which a short side of the housing 10 extends and perpendicular to the axis X is defined as an axis Y. In addition, a direction perpendicular to the axis X and the axis Y is defined as an axis Z. In order to facilitate the description of the structure of elements, FIG. 2 is an exploded view of the pressing module 100 rotated 180 degrees with the axis Y as a rotation axis.

In this embodiment, in order to facilitate modular assembling of the pressing module 100 to the electronic device 90, a locking structure and a snap-fit structure that facilitate assembling are disposed on two opposite sides of the housing 10 along the long side, respectively. As shown in FIG. 2, a hook 14 is provided on a side of the second surface 12 of the housing 10 and on a side of the slot 13 close to a negative direction of the axis Y, and is configured to be snapped into the electronic device 90. In order to strengthen the locking, on the opposite side at which the hook 14 is disposed, an engaging portion 15 protruding from the second surface 12 is provided. The housing 10 can be first positioned on the electronic device 90 through snap-fitting of the engaging portion 15, and the hook 14 is then snapped into the electronic device 90.

As can be seen from FIG. 1 to FIG. 3, the operation panel 20 is pressibly accommodated in the slot 13. A shape of the operation panel 20 corresponds to and is slightly less than a shape of the slot 13, so that the operation panel 20 can be accommodated in the slot 13 and cover the slot 13 as much as possible, but can also reciprocate in the slot 13 freely. In this embodiment, the operation panel 20 is described with a touchpad as an example, but the present disclosure is not limited thereto. The operation panel 20 may not only be a large plate-shaped touchpad, but also may be in the form of a plurality of keys.

The waterproof fixing frame 30 is disposed on the second surface 12 of the housing 10 and the operation panel 20, and covers a junction between the second surface 12 and the operation panel 20. The waterproof fixing frame 30 is capable of preventing liquid or water vapor from entering the side of the second surface 12 of the housing 10 from a place that is not completely shielded between the slot 13 of the housing 10 and the operation panel 20. Therefore, the waterproof fixing frame 30 needs to be able to cover the gaps, that is, the junction between the housing 10 and the operation panel 20 in the slot 13. The waterproof fixing frame 30 may be a full cover sheet covering the entire slot 13 and larger than the area of the slot 13. This method is applicable to use in the form of the plurality of keys for ease of assembling and enhancement of waterproofness. In this embodiment, since the operation panel 20 is a complete piece of touchpad, the waterproof fixing frame 30 is a hollow frame and is disposed around the slot 13. In this way, the required waterproof effect can be achieved, materials used can be saved, and the middle region of the operation panel 20 may also be vacated for assembling of electronic elements.

In some embodiments, the waterproof fixing frame 30 may be adhered to the second surface 12 of the housing 10 and the operation panel 20 through adhesion, for example. In this embodiment, as shown in FIG. 3 and FIG. 4, a plurality of first protruding posts 16 protrude from the second surface 12 of the housing 10. As can be seen from FIG. 3, all protruding posts protruding from the second surface 12 of the housing 10 may be regarded as the first protruding posts 16. A position, a shape, and a size of each of the first protruding posts 16 may be designed and adjusted based on the elements that are assembled to the first protruding posts. A plurality of second protruding posts 21 protrude on the operation panel 20 from a side of the second surface 12 of the housing 10. The waterproof fixing frame 30 is sleeved on the first protruding posts 16 and the second protruding posts 21. As can be seen from FIG. 2 to FIG. 4, some of the first protruding posts 16 are disposed around the slot 13 and extend and protrude toward a negative direction of the axis Z on the second surface 12 of the housing 10. The second protruding posts 21 are arranged around an inner side of a peripheral edge of the operation panel 20. Numbers, shapes, and positions of the first protruding posts 16 and the second protruding posts 21 may be adjusted as required.

A plurality of first through holes 31 are provided at positions corresponding to the first protruding posts 16 along an outer periphery on the waterproof fixing frame 30, and a plurality of second through holes 32 are provided at positions corresponding to the second protruding posts 21 along an inner periphery. The waterproof fixing frame 30 is disposed on the second surface 12 of the housing 10 and the operation panel 20 by the first through holes 31 to be correspondingly sleeved on the first protruding posts 16 and the second through holes 32 to be correspondingly sleeved on the second protruding posts 21, as shown in FIG. 4.

Next, the passing module may further include a fixing frame 30. Referring to FIG. 2 and FIG. 5, after the waterproof fixing frame 30 is assembled, and the fixing member 40 may be sleeved on the second surface 12 of the housing 10 and disposed between the waterproof fixing frame 30 and the elastic member 50. In some implementations, the fixing member 40 may be omitted, or the fixing member 40 may be a whole piece of solid element pressed on the waterproof fixing frame 30, or a plurality of long strip elements may be respectively pressed against edges of the waterproof fixing frame 30, so that the waterproof fixing frame 30 is tightly pressed against the housing 10 to provide a better waterproof effect.

In this embodiment, the fixing member 40 is a hollow frame and is disposed on the waterproof fixing frame 30 at the periphery of an outer side of the operation panel 20, so as to provide a better and reliable pressing effect, so that the fixing member 40 can be firmly pressed against an outer periphery of the entire waterproof fixing frame 30. In addition, in order to allow the operation panel 20 to reciprocate freely in the direction of the axis Z more smoothly, a hollow part of the fixing member 40 is also hollowed out corresponding to the shape of the operation panel 20, so as to provide more displacement space for the operation panel 20 and increase a moving space during the pressing operation.

Moreover, the fixing member 40 may also be sleeved on the first protruding posts 16 for assembling. As can be seen from FIG. 2 and FIG. 5, in this embodiment, a plurality of third through holes 41 are provided around the fixing member 40, and the third through holes 41 are correspondingly sleeved on the first protruding posts 16. The first protruding post 16 may be made of a hot-melt material. Upon completion of assembling of the fixing member 40, tail ends of the first protruding post 16 may be heated and melted through hot melting and are firmly pressed against the fixing member 40 after being cooled and fixed, and the fixing member 40 and the waterproof fixing frame 30 are fixed to the second surface 12 of the housing 10. In some implementations, the first protruding posts 16 may also be a hollow column, and a height is slightly lower than or flush with an end surface of the third through hole 41 after the fixing member 40 is assembled. The fixing member is locked to the first protruding posts 16 through screws, and the fixing member 40 and the waterproof fixing frame 30 are fixed to the second surface 12 of the housing 10.

Referring to FIG. 2 and FIG. 6, the elastic member 50 is disposed on the waterproof fixing frame 30, and the elastic member 50 includes a fixed side 51, a movable side 52, two elastic arms 53, and two connecting portions 54 to provide an elastic restoring force for the operation panel 20. The fixed side 51 and the movable side 52 are disposed on two opposite sides, the two connecting portions 54 are respectively connected between the movable side 52 and the fixed side 51, and one end of each of the elastic arms 53 is connected to the connecting portion 54 and another end of each of the elastic arms 53 is extended to the fixed side 51. After the operation panel 20 is pressibly displaced in a negative direction of the axis Z under the force of the direction of the axis Z, the elastic member 50 can provide the operation panel 20 with an elastic restoring force in a positive direction of the axis Z, so that the operation panel 20 returns to an original position.

As can be seen from FIG. 2 and FIG. 6, the fixed side 51 of the elastic member 50 is fixed to the second surface 12 and is located on one side of the operation panel 20 and the waterproof fixing frame 30. The fixed side 51 may include a plurality of extension arms 511 and fourth through holes 512. Each of the extension arms 511 has fifth through holes 5111 and sixth through holes 5112. When the fixed side 51 is disposed on the second surface 12, the fourth through holes 512 are sleeved on the second protruding posts 21 of the operation panel 20, and the fifth through holes 5111 are sleeved on the first protruding posts 16 of the engaging portion 15. The first protruding post 16 is made of a hot-melt material. Upon completion of assembling of the extension arms 511, tail ends of the first protruding posts 16 may be heated and melted through hot melting and are firmly pressed against the extension arms 511 after being cooled and fixed, and the fixed side 51 is fixed to the second surface 12 of the housing 10.

In addition, a plurality of third protruding posts 42 may also protrude from the fixing member 40 corresponding to the sixth through holes 5112, and the sixth through holes 5112 of the extension arms 511 of the fixed side 51 are sleeved on the third protruding posts 42. Similarly, the second protruding post 21 and the third protruding post 42 are made of a hot-melt material. Upon completion of assembling of the fixed side 51, tail ends of the second protruding post 21 and the third protruding post 42 may be heated and melted through hot melting and are firmly pressed against the fixed side 51 after being cooled and fixed, and the fixed side 51 is fixed to the second surface 12 of the housing 10.

Still referring to FIG. 2 and FIG. 6, the movable side 52 is fixed to the operation panel 20 and is located on the other sides of the operation panel 20 and the waterproof fixing frame 30. The movable side 52 has a plurality of seventh through holes 521 sleeved on the second protruding posts 21 of the operation panel 20. The second protruding post 21 is made of a hot-melt material. Upon completion of assembling of the movable side 52, tail ends of the second protruding posts 21 may be heated and melted through hot melting and are firmly pressed against the movable side 52 after being cooled and fixed, and the movable side 52 is fixed to the operation panel 20. In this way, the movable side 52 moves with the operation panel 20, and via the support of the fixed side 51, the elastic restoring force required for the operation panel 20 to be reset is provided.

In addition, in this embodiment, each of the connecting portions 54 includes a first end 541 and a second end 542. The first end 541 of each of the connecting portions 54 is connected to the fixed side 51, and the second end 542 of each of the connecting portions 54 is connected to the movable side 52. Each of the connecting portions 54 has a plurality of eighth through holes 543. The eighth through holes 543 are sleeved on the second protruding posts 21, so that the connecting portions 54 are assembled to the operation panel 20. Furthermore, in this embodiment, the two connecting portions 54 may be two strip-shaped sheet bodies and are disposed at two parallel ends of the fixed side 51 and the movable side 52, so that the fixed side 51, the movable side 52, and the two connecting portions 54 form a hollow frame (such as a hollow rectangular frame). In this way, a weight of the elastic member 50 may be reduced as much as possible, and the middle position of the operation panel 20 may also be vacated to facilitate direct assembling of electronic elements to the operation panel 20 to provide touch functions, and the like. In other implementations, the connecting portion 54 may not be disposed, either, but a complete rectangular sheet body is used as the elastic member 50, and the two sides of the connecting portion are the fixed side 51 and the movable side 52.

The two elastic arms 53 are disposed on the two connecting portions 54, respectively, and a first end 531 of each of the elastic arms 53 is located on the fixed side 51, and a second end 532 of the elastic arm 53 is located on the movable side 52. As can be seen from FIG. 2, the second end 532 of each of the elastic arms 53 is connected to the second end 542 of the connecting portion 54, and the first end 531 of each of the elastic arms 53 is extended from the second end 532 to the fixed side 51. A ninth through hole 533 is provided at the first end 531 of each of the elastic arms 53, and the first protruding post 16 may be provided corresponding to the ninth through hole 533 on the second surface 12 of the housing 10. The ninth through hole 533 is sleeved on the first protruding post 16, tail ends of the first protruding posts 16 are heated and melted through hot melting and are firmly pressed against the elastic arms 53 after being cooled and fixed, and the first ends 531 of the elastic arms 53 are fixed to the second surface 12 of the housing 10. The arrangement of the two elastic arms 53 may provide more supporting force for the elastic member 50, and may also prevent the elastic member 50 from displacing too much when subjected to a large pressing force, or deforming and sinking after being repeatedly pressed and used for a long time.

It can be seen from FIG. 2 and FIG. 6 that each of the elastic arms 53 of this embodiment is L-shaped to provide the required elastic restoring force, but the present disclosure is not limited thereto, and the elastic arm may also be in various shapes that can provide the elastic restoring force, for example, a straight strip sheet body. In addition, a number of elastic arms 53 may not only be two, but more may be disposed depending on the size of the operation panel 20 and the required elastic restoring force.

Referring to FIG. 2 and FIG. 7, the pressing module 100 may further include a pressing feedback assembly 60 disposed on the movable side 52 of the elastic member 50 and fixed to the second surface 12. The pressing feedback assembly 60 includes an assembling plate 61 and a resilient structure 62. The pressing feedback assembly 60 is to provide more operation feel and provide more support force for the operation panel 20. In some implementations, the assembling plate 61 may cover the entire operation panel 20, or may only cover a place where the operation panel 20 is prone to be pressed repeatedly. In this embodiment, the assembling plate 61 is elongated and spans the operation panel 20, and is spaced apart from the operation panel 20 by a gap, so that there is a space between the operation panel 20 and the assembling plate 61 that allows displacement caused by pressing the operation panel 20 and allows the resilient structure 62 to accommodate and deform. Two ends of the assembling plate 61 are locked to locking holes 17 of the second surface 12 of the housing 10. In addition, a middle section of the assembling plate 61 corresponding to the operation panel 20 may be widened to provide stronger support.

The resilient structure 62 is disposed between the assembling plate 61 and the operation panel 20 and located in the gap. It may be seen from FIG. 2 that two resilient structures 62 are provided in this embodiment. One end of each of the resilient structures 62 is connected to the assembling plate 61, and the other end of each of the resilient structures 62 abuts against the operation panel 20. The resilient structure 62 may correspond to a left key or a right button that is prone to be pressed against the operation panel 20 for the touch panel, so as to provide more operation feel. In some embodiments, the resilient structure 62 may be a metal shrapnel.

Based on the above, it can be seen in combination with the cross-sectional view of FIG. 8 that the waterproof fixing frame 30 covering the junction between the housing 10 and the operation panel 20 in the slot 13 is used in the pressing module 100, which can prevent fluid or water vapor from flowing to a side of the second surface 12 of the housing 10 through the slot 13 and via the gap between the housing 10 and the operation panel 20. The fixing member 40 may further press the waterproof fixing frame 30 to prevent liquid or water vapor from flowing in. The elastic member 50 not only provides the elastic restoring force for the operation panel 20 to rebound, but also presses against the waterproof fixing frame 30 on the operation panel 20, which not only can retain the pressing tactility feedback, but also can prevent liquid or water vapor from flowing in from the operation panel 20. A separate arrangement of the fixing member 40 and the elastic member 50 may allow the operation panel 20 to have more pressing displacement space in the direction of the axis Z, thereby increasing the operation feel.

In addition, the waterproof fixing frame 30 and the elastic member 50 may also be made separately by using a single-material injection method. In addition to being applicable to the operation panel 20 with a large area, due to a high yield rate of the single-material injection method, costs can also be reduced, and a yield rate of the product can be increased.

Although the technical content of the present disclosure is provided above in preferred embodiments, the technical content is not intended to limit the present disclosure. Some changes and refinements made by anyone skilled in the art without departing from a spirit of the present disclosure shall be encompassed in the scope of the present disclosure. Therefore, protection scope of the present disclosure shall be subject to scope defined by the attached claims.

What is claimed is:

1. A pressing module, comprising: a housing comprising a first surface, a second surface opposite to the first surface and a slot, wherein the slot passes through the first surface and the second surface; an operation panel pressibly accommodated in the slot; a waterproof fixing frame disposed on the second surface of the housing and the operation panel and covering a junction between the second surface and the operation panel; and an elastic member disposed on the waterproof fixing frame, wherein the elastic member comprises a fixed side and a movable side opposite to the first side, the fixed side is fixed to the second surface, and the movable side is fixed to the operation panel, so that the elastic member is capable of providing an elastic restoring force for the operation panel, wherein a plurality of first protruding posts protrude from the second surface of the housing, a plurality of second protruding posts protrude from the operation panel, and the waterproof fixing frame is sleeved on the first protruding posts and the second protruding posts, wherein a fixing member is sleeved on the first protruding posts and is disposed between the waterproof fixing frame and the elastic member, and wherein a plurality of third protruding posts protrude from the fixing member, the fixed side of the elastic member is sleeved on the first protruding posts, the second protruding posts, and the third protruding posts, and the movable side of the elastic member is sleeved on the second protruding posts.

2. The pressing module according to claim 1, wherein the fixed side is sleeved on the first protruding posts and the second protruding posts, and the movable side is sleeved on the second protruding posts.

3. The pressing module according to claim 1, wherein the first protruding posts, the second protruding posts, and the third protruding posts are made of a hot-melt material.

4. The pressing module according to claim 1, wherein the fixing member is a hollow frame.

5. The pressing module according to claim 1, wherein the elastic member further comprises an elastic arm and a connecting portion, the connecting portion is connected between the movable side and the fixed side, one end of the elastic arm is connected to the connecting portion, another end of the elastic arm is extended toward the fixed side, the elastic arm is sleeved on the first protruding posts to be assembled to the second surface, and the connecting portion is sleeved on the second protruding posts to be assembled to the operation panel.

6. The pressing module according to claim 5, wherein the fixed side, the movable side, and the connecting portion form a hollow frame.

7. The pressing module according to claim 1, wherein the elastic member further comprises an elastic arm and a connecting portion, the connecting portion is connected between the movable side and the fixed side, one end of the elastic arm is connected to the connecting portion and another end of the elastic arm is extended toward the fixed side.

8. The pressing module according to claim 7, wherein the fixed side, the movable side, and the connecting portion form a hollow frame.

9. The pressing module according to claim 1, wherein the waterproof fixing frame is a hollow frame.

10. A pressing module, comprising: a housing comprising a first surface, a second surface opposite to the first surface and a slot, wherein the slot passes through the first surface and the second surface; an operation panel pressibly accommodated in the slot; a waterproof fixing frame disposed on the second surface of the housing and the operation panel and covering a junction between the second surface and the operation panel; and an elastic member disposed on the waterproof fixing frame, wherein the elastic member comprises a fixed side and a movable side opposite to the first side, the fixed side is fixed to the second surface, and the movable side is fixed to the operation panel, so that the elastic member is capable of providing an elastic restoring force for the operation panel; and a pressing feedback assembly disposed on the movable side of the elastic member and fixed to the second surface, wherein the pressing feedback assembly comprises an assembling plate and a resilient structure, the assembling plate is spaced apart from the operation panel by a gap, the resilient structure is disposed between the assembling plate and the operation panel and is located in the gap, one end of the resilient structure is connected to the assembling plate, and the other end abuts against the operation panel.

\* \* \* \* \*